US010775689B2

(12) United States Patent
Pan et al.

(10) Patent No.: US 10,775,689 B2
(45) Date of Patent: Sep. 15, 2020

(54) ILLUMINATION SYSTEM AND PROJECTION APPARATUS

(71) Applicant: Coretronic Corporation, Hsin-Chu (TW)

(72) Inventors: Haw-Woei Pan, Hsin-Chu (TW); Chi-Tang Hsieh, Hsin-Chu (TW); Chih-Hsien Tsai, Hsin-Chu (TW); Jo-Han Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 49 days.

(21) Appl. No.: 16/012,680

(22) Filed: Jun. 19, 2018

(65) Prior Publication Data

US 2018/0373135 A1 Dec. 27, 2018

(30) Foreign Application Priority Data

Jun. 21, 2017 (CN) .......................... 2017 1 0472808

(51) Int. Cl.

*G03B 21/00* (2006.01)
*F21V 8/00* (2006.01)
*G03B 21/20* (2006.01)
*G03B 33/08* (2006.01)
*G02B 5/32* (2006.01)
*G02B 27/14* (2006.01)
*G02B 26/00* (2006.01)

(52) U.S. Cl.

CPC ....... *G03B 21/2066* (2013.01); *G03B 21/204* (2013.01); *G03B 33/08* (2013.01); *G02B 5/32* (2013.01); *G02B 26/008* (2013.01); *G02B 27/141* (2013.01)

(58) Field of Classification Search

None

See application file for complete search history.

(56) References Cited

U.S. PATENT DOCUMENTS 6,313,931 B1 11/2001 Gnaedig et al.
9,435,996 B2 9/2016 Kim et al.
(Continued)

FOREIGN PATENT DOCUMENTS

CN 201984218 U 9/2011
CN 103592770 A 2/2014
(Continued)

*Primary Examiner* — Sharon E Payne

(57) ABSTRACT

An illumination system includes at least one excitation light source, a holographic optical element and a phosphor wheel. The excitation light source provides a first color beam. The holographic optical element is located on a path of the first color beam and transmits the first color beam to the phosphor wheel along a first path. The phosphor wheel has a light wavelength conversion portion and a reflective portion. The light wavelength conversion portion converts the first color beam into a second color beam and reflects the second color beam back to the holographic optical element. The reflective portion reflects the first color beam back to the holographic optical element. The holographic optical element transmits the second color beam and the first color beam reflected from the phosphor wheel along a second path, and the first path is different from the second path. A projection apparatus is also provided.

11 Claims, 7 Drawing Sheets

200

210 A1 B11 E 211 271 270 250 212 θ1 272 L12 240 B51 N2 220 θ2 221 N1 251 222 B12 L11 B11a 235 234 230

(56) References Cited

U.S. PATENT DOCUMENTS

| | | | | |
|---|---|---|---|---|
| 2004/0042525 | A1* | 3/2004 | Offerhaus | G02B 5/32 372/97 |
| 2005/0046809 | A1* | 3/2005 | Way | G02B 6/0023 353/99 |
| 2011/0037953 | A1* | 2/2011 | Nizani | G02B 3/005 353/38 |
| 2013/0176540 | A1 | 7/2013 | Wei et al. | |
| 2014/0160441 | A1* | 6/2014 | Kim | G03B 21/204 353/33 |
| 2014/0254130 | A1* | 9/2014 | Mehl | G03B 21/204 362/84 |
| 2015/0338061 | A1 | 11/2015 | Huang | |
| 2017/0010523 | A1 | 1/2017 | Egawa | |

FOREIGN PATENT DOCUMENTS

| | | | |
|---|---|---|---|
| CN | 205384439 | U | 7/2016 |
| CN | 106125475 | A | 11/2016 |
| CN | 107429886 | A | 12/2017 |
| WO | 2014196015 | A1 | 12/2014 |

* cited by examiner

ILLUMINATION SYSTEM AND PROJECTION APPARATUS

CROSS-REFERENCE TO RELATED APPLICATION

THIS APPLICATION CLAIMS THE PRIORITY BENEFIT OF CHINA APPLICATION (CN201710472808.3 FILED ON 2017 Jun. 21). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a light source module, and more particularly to an illumination system and a projection apparatus using the same.

BACKGROUND OF THE INVENTION

A digital light processing (DLP) projection apparatus includes an illumination system, a digital micro-mirror device (DMD) and a projection lens. The illumination system is used to provide an illumination beam, the digital micro-mirror device is used to convert the illumination beam into an image beam, and the projection lens is used to project the image beam onto a screen to form an image on the screen. Ultra-high pressure mercury lamp is the light source used in early illumination system, and the ultra-high pressure mercury lamp can provide white light as an illumination beam. With the development of illumination technology, some light sources such as the light emitting diode light source and laser light source with power-saving advantage are gradually being used.

FIG. 1 is a schematic view of a conventional illumination system using a laser light source. As shown in FIG. 1, in the conventional illumination system 100, the blue beam 112 provided by the laser light source module 110 sequentially passes through the collimating element 122, the dichroic mirror 130 and the lenses 123 and 124 and is irradiated to the rotatable phosphor wheel 140. The phosphor wheel 140 can be divided into a green phosphor zone, a yellow phosphor zone and a light penetration zone. The back surface 141 of the phosphor wheel 140 corresponding to the green phosphor zone and the yellow phosphor zone is disposed with a reflective element (not shown). The blue beam 112 is sequentially irradiated to the green phosphor zone, the yellow phosphor zone and the light penetration zone. When the blue beam 112 is irradiated to the green phosphor zone and the yellow phosphor zone, the green beam 113 and the yellow beam 114 are excited. The reflective element reflects the green beam 113 and the yellow beam 114 to the dichroic mirror 130. The green beam 113 and the yellow beam 114 are reflected by the dichroic mirror 130, pass through the lens 123 and are irradiated to the rotatable filter wheel 150. In addition, a portion of the blue beam 112 passes through the light penetration zone and is irradiated to the filter wheel 150 sequentially via the lenses 126 and 127, the reflective elements 161 and 162, the lens 128, the reflective element 163, the lens 129 and the dichroic mirror 130.

The filter wheel 150 has a red filter zone and a transparent zone corresponding to the yellow phosphor zone, a green filter zone corresponding to the green phosphor zone, and a diffusion zone corresponding to the light penetration zone. The green beam 113 is irradiated to the green filter zone, the yellow beam 114 is irradiated to the red filter zone and the transparent zone, and the blue beam 112 is irradiated to the diffusion zone by controlling the filter wheel 150 and the phosphor wheel 140 to rotate with each other. As a result, the beam entering the light integration rod 170 after passing through the filter wheel 150 includes a blue beam, a green beam and a red beam for forming a color image and a yellow beam for increasing the luminance.

Since the structure of the conventional illumination system 100 is complicated and many optical elements are required, the conventional illumination system 100 has some disadvantages such as high cost, large volume and poor optical efficiency.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides an illumination system to simplify the complex optical layout and thereby reducing the volume.

The invention provides a projection apparatus having the advantage of smaller volume.

Other advantages of the invention may be further understood from the technical features disclosed below.

In order to achieve one or a portion or all of the above objectives or other objectives, the invention provides an illumination system, which includes at least one excitation light source, a holographic optical element and a phosphor wheel. The at least one excitation light source is for providing a first color beam. The holographic optical element is located on a transmission path of the first color beam and for transmitting the first color beam to the phosphor wheel along a first path. The phosphor wheel has a light wavelength conversion portion and a reflective portion. The light wavelength conversion portion is for converting the first color beam into a second color beam and reflecting the second color beam back to the holographic optical element. The reflective portion is for reflecting the first color beam back to the holographic optical element. The holographic optical element is for transmitting the second color beam and the first color beam reflected from the phosphor wheel along a second path, and the first path is different from the second path.

In order to achieve one or a portion or all of the above objectives or other objectives, the invention provides a projection apparatus, which includes the aforementioned the illumination system, a light valve and a projection lens. The illumination system is for providing an illumination beam. The light valve is disposed on a transmission path of the illumination beam provided by the illumination system and for converting the illumination beam into an image beam. The projection lens is disposed on a transmission path of the image beam.

In summary, the illumination system of the embodiment of the invention is disposed with a holographic optical element on the transmission path of the first color beam, and the first color beam provided from the at least one excitation light source is transmitted to the light wavelength conversion portion and the reflective portion of the phosphor wheel by the holographic optical element. Thus, the second color beam reflected by the light wavelength conversion portion and the first color beam reflected by reflective portion are reflected back to the holographic optical element, pass through the holographic optical element and are transmitted along the same path, thereby forming an illumination beam. Therefore, compared with the prior art, the illumination system of the embodiment of the invention can simplify the complex optical layout and reduce the overall volume thereof due to employing less number of optical elements.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
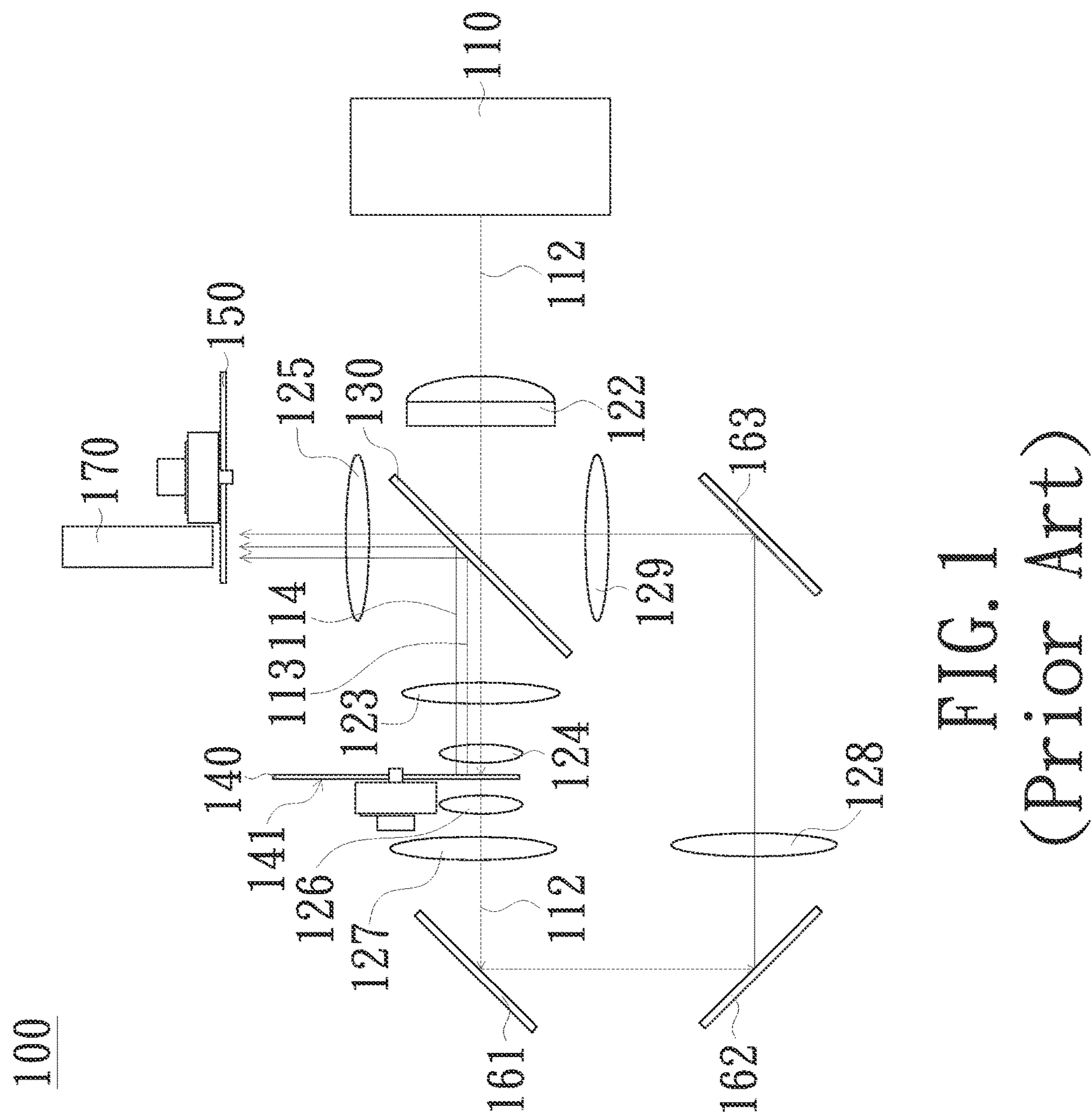
FIG. 1 is a schematic view of a conventional illumination system using a laser light source.
Figure 2:
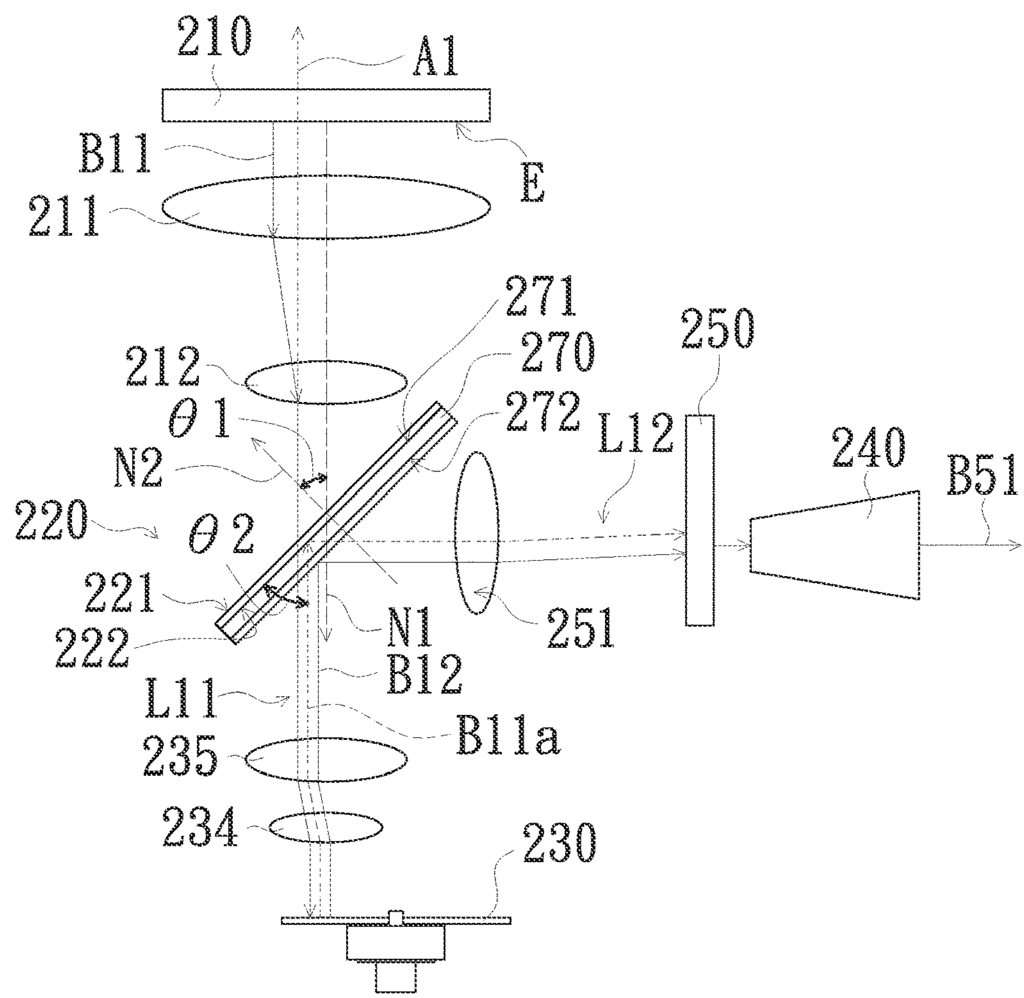
FIG. 2 is a schematic view of an illumination system in accordance with an embodiment of the invention.
Figure 3:
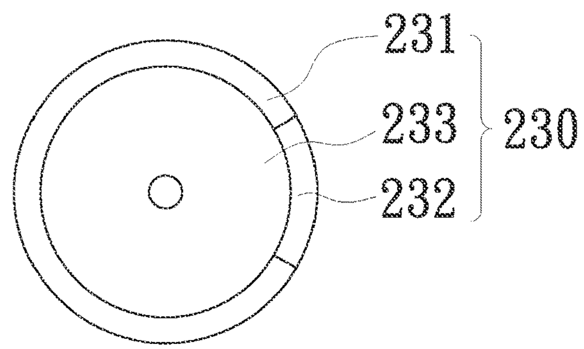
FIG. 3 is a schematic top view of a phosphor wheel in FIG. 2.

FIG. 2 is a schematic view of an illumination system in accordance with an embodiment of the invention. FIG. 3 is a schematic top view of a phosphor wheel in FIG. 2. As shown in FIGS. 2 and 3, an embodiment of the invention provides an illumination system 200, which includes at least one excitation light source 210, a holographic optical element 220 and a phosphor wheel 230. The excitation light source 210 is used to provide a first color beam B11. The holographic optical element 220 is located on the transmission path of the first color beam B11 and allows the first color beam B11 to be transmitted to the phosphor wheel 230 along a first path L11. The phosphor wheel 230 has a light wavelength conversion portion 231 and a reflective portion 232. The light wavelength conversion portion 231 is used to convert a first color beam B11 into a second color beam B12 and reflect the second color beam B12 back to the holographic optical element 220. The reflective portion 232 is used to reflect a first color beam B11*a* back to the holographic optical element 220, wherein the first color beam B11*a* is a portion of the first color beam B11. The holographic optical element 220 is used to transmit the second color beam B12 and the first color beam B11*a* reflected from the phosphor wheel 230 along a second path L12, wherein the first path L11 is different from the second path L12. In one embodiment, the first path L11 is perpendicular to the second path L12, but the invention is not limited thereto.

The embodiment is exemplified by one excitation light source 210. The excitation light source 210 includes, for example, a plurality of laser elements (not shown). The laser elements are, for example, arranged as an array. The laser elements are, for example, laser diodes (LDs). In other embodiments, the excitation light source 210 may be plural. The excitation light source 210 has, for example, a light exit surface E. The light exit surface E has an optical axis N1. The holographic optical element 220 has, for example, a top surface 221 corresponding to the light exit surface E. The angle θ1 of the included angle between the optical axis N1 and the normal line N2 of the top surface 221 may be between 20 degrees and 70 degrees. In the embodiment, the angle θ1 of the included angle is 45 degrees for example, but the embodiment does not limit the above numerical range.

The phosphor wheel 230 of the embodiment includes, for example, a turntable 233 and a motor (not shown) for driving the turntable 233 to rotate. The light wavelength conversion portion 231 and the reflective portion 232 are, for example, disposed on the turntable 233. The light wavelength conversion portion 231 is disposed with a phosphor.

The phosphor is a yellow phosphor for example, but the invention is not limited thereto. The light wavelength conversion portion 231 may be divided into a plurality of regions and disposed with plurality types of phosphors. When the motor drives the turntable 233 to rotate, the first beam B11 provided by the excitation light source 210 is irradiated to the light wavelength conversion portion 231 and the reflective portion 232 sequentially, so that the first color beam B11 excites the phosphor to generate the second color beam B12, which is reflected back to the holographic optical element 220. Specifically, the light wavelength conversion portion 231 may be further disposed with a reflective layer or a reflective coating layer (not shown), and the phosphor is disposed on the reflective layer to reflect the light generated by the phosphor, thereby increasing the usage rate of the second color beam B12, but the invention is not limited thereto. The turntable 233 may be a metallic material and have a reflective function, such as a polished aluminum substrate. In addition, the first color beam B11*a* is irradiated to the reflective portion 232 and reflected back to the holographic optical element 220. The first color beam B11 of the embodiment is a blue beam and the second color beam B12 is a yellow beam for example, but the invention is not limited thereto.

The holographic optical element 220 of the embodiment is located, for example, between the excitation light source 210 and the phosphor wheel 230. The excitation light source 210 is located in a first extension direction A1 of the first path L11, wherein the first extension direction A1 is, for example, the extension direction of the first path L11 from the phosphor wheel 230 toward the bottom surface 222 of the holographic optical element 220. The first color beam B11 transmitted from the excitation light source 210 toward the holographic optical element 220 passes through the holographic optical element 220 and is transmitted to the phosphor wheel 230 along the first path L11. The first color beam B11*a* reflected from the phosphor wheel 230 is reflected by the holographic optical element 220 to be transmitted along the second path L12.

When a holographic optical element is fabricated (or written), it is to be noted that a reference beam and an object beam are irradiated at a surface of the holographic optical element to complete the fabrication of the holographic optical element. When the holographic optical element is read, a reconstruction beam is irradiated at the surface of the holographic optical element at the incident angle of the reference beam, wherein the reconstruction beam has the same light wavelength as the object beam and the holographic optical element has an effect on the reconstruction beam. That is, the holographic optical element has a characteristic of changing the traveling direction of a light having a specific light wavelength and incident at a predetermined incident angle. At a macroscopic point of view, a beam can pass through the holographic optical element without observing the refractive and reflective characteristics of geometrical optics. The types of holographic optical elements include reflective holographic optical elements (R-type HOE) and transmitted holographic optical elements (T-type HOE). For a reflective holographic optical element, the light incident at a predetermined incident angle and the light exiting with a changed traveling direction are located on the same side of the reflective holographic optical element. For a transmitted holographic optical element, the light incident at a predetermined incident angle and the light exiting with a changed traveling direction are located on the opposite sides of the transmitted holographic optical element.

In the embodiment as shown in FIGS. 2 and 3, the holographic optical element 220 is a reflective holographic optical element, and the first color beam B11*a* reflected from the phosphor wheel 230 is reflected by the holographic optical element 220. It is to be noted that the holographic optical element 220 reflects only the light having the same wavelength as the first color beam B11*a* and incident at a predetermined incident angle (90-θ2), wherein, for example, the angle θ2 is the included angle between the main beam of the first color beam B11*a* and the bottom surface 222 of the holographic optical element 220, and the angle θ1 can be matched with the angle θ2 and both are 45 degrees. In other embodiments, the angle θ1 may be different from the angle θ2 and the angle θ2 may be an incident angle of 40 to 44 degrees based on the holographic optical element of the invention. The first color beam B11*a* reflected from the reflective portion 232 can be incident on the holographic optical element 220 at a predetermined incident angle (90-θ2) and reflected by the holographic optical element 220 to be transmitted along the second path L12.

Further, the holographic optical element 220 of the embodiment includes a reflective holographic (R-type HOE) layer 220-1 (shown in FIGS. 4A and 4B), a dichroic layer 260 (shown in FIGS. 4A and 4B) and a substrate 270, wherein the reflective holographic layer 220-1 and the dichroic layer 260 are stacked on each other. Specifically, the substrate 270 has, for example, a first surface 271 and a second surface 272 opposite to the first surface 271. The reflective holographic layer 220-1 is disposed on the first surface 271, and the dichroic layer 260 is disposed on the second surface 272. The reflective holographic layer 220-1 allows the first color beam B11 transmitted from the excitation light source 210 toward the holographic optical element 220 to pass therethrough. In addition, the reflective holographic layer 220-1 allows the second color beam B12 to pass therethrough. A first color beam B11*a* transmitted from the phosphor wheel 230 toward the holographic optical element 220 and incident at a predetermined incident angle (90-θ2) is reflected by the reflective holographic layer 220-1 to be transmitted along the second path L12. The dichroic layer 260 allows the first color beam B11 and the first color beam B11*a* to pass therethrough and reflects the second color beam B12 to be transmitted along the second path L12, but the invention is not limited thereto. In one embodiment, the reflective holographic layer 220-1 may be disposed on the second surface 272 of the substrate 270 and the dichroic layer 260 may be disposed on the first surface 271, and the same effect is also achieved by the features of each of the above optical elements. The substrate 270 is, for example, a material suitable for allowing light to penetrate therethrough, such as a plastic or glass material, but the invention is not limited thereto.

Based on the optical layout design architecture of the illumination system 200 described above, the first beam B11 provided by the excitation light source 210 passes through the reflective holographic layer 220-1 and the dichroic layer 260 located on the second surface 272 of the substrate 270. The first color beam B11 is then irradiated to the light wavelength conversion portion 231 of the phosphor wheel 230 along the first path L11 and the second color beam B12 is excited. The second color beam B12 is reflected by the reflective layer disposed on the rear surface of the light wavelength conversion portion 231 to the dichroic layer 260 and reflected by the dichroic layer 260 to be transmitted along the second path L12. The first color beam B11 is irradiated to the reflective portion 232 of the phosphor wheel 230 along the first path L11, reflected by the reflective portion 232 to pass through the dichroic layer 260, incident on the reflective holographic layer 220-1 at a predetermined incident angle (90-θ2), and then reflected by the reflective holographic layer 220-1 to be transmitted along the second path L12.

In the illumination system 200 of the embodiment of the invention, the holographic optical element 220 is disposed on the transmission path of the first color beam B11, and the first color beam B11 provided from the excitation light source 210 is transmitted to the light wavelength conversion portion 231 and the reflective portion 232 of the phosphor wheel 230 by the holographic optical element 220. In addition, when the second color beam B12 reflected by the light wavelength conversion portion 231 and the first color beam B11*a* reflected by the reflective portion 232 are reflected back to the holographic optical element 220, the holographic optical element 220 is adapted to reflect the first color beam B11*a* incident at a predetermined incident angle (90-θ2), so that the first color beam B11*a* is transmitted along the same path (the second path L12) as the second color beam B12. Thus, the illumination system 200 of the embodiment of the invention can simplify the complex optical layout and reduce the overall volume thereof.

The illumination system 200 of the embodiment may further include a light integration rod 240 and a filter wheel 250. The light integration rod 240 and the filter wheel 250 are disposed on the second path L12, and the filter wheel 250 is located between the light integration rod 240 and the holographic optical element 220. As the filter wheel 250 rotates, the first color beam B11*a* and the second color beam B12 are divided into a plurality of sub-beams of different colors such as a red sub-beam, a green sub-beam and a blue sub-beam. In addition, the light integration rod 240 is a tapered light integration rod for example, but the invention is not limited thereto. In addition, the illumination system 200 may further include other optical elements such as lenses 211 and 212 disposed between the excitation light source 210 and the holographic optical element 220, lenses 234 and 235 disposed between the holographic optical element 220 and the phosphor wheel 230, and a lens 251 disposed between the holographic optical element 220 and the filter wheel 250. The first color beam B11*a* and the second color beam B12 pass through the illumination system 200 to form an illumination beam B51.

Figure 4A:
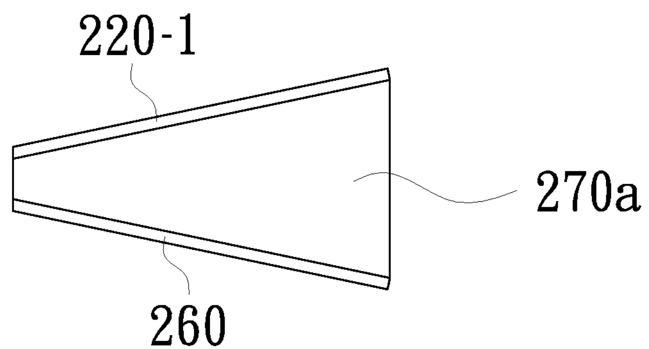
FIG. 4A is a schematic view of a holographic optical element of an illumination system in accordance with another embodiment of the invention.

In addition, in other embodiments, the first surface of the substrate may not to be parallel to the second surface according to the design requirement. For example, as shown in FIG. 4A, the two surfaces of the substrate 270*a* are inclined with respect to each other, so that the reflective holographic layer 220-1 and the dichroic layer 260 have a non-parallel arrangement.

Figure 4B:
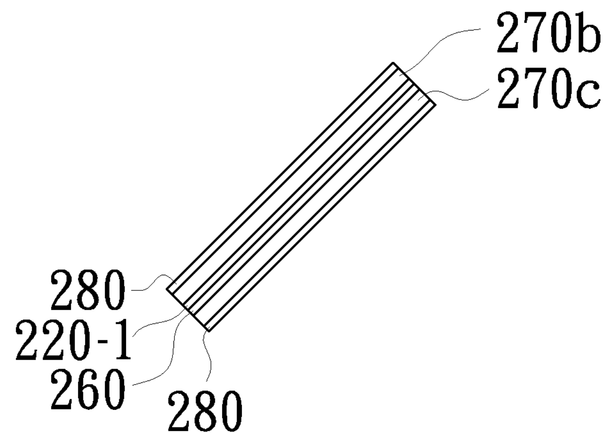
FIG. 4B is a schematic view of a holographic optical element of an illumination system in accordance with another embodiment of the invention.

In other embodiments, in order to avoid a problem of insufficient uniform light caused by that the sub-beams of a plurality of different colors passing through the filter wheel 250 have the difference in the speckle position on the light entrance surface of the light integration rod 240 resulted from the difference in the optical path length between the first color beam B11*a* and the second color beam B12, the illumination system 200 may dispose the reflective holographic layer 220-1 and the dichroic layer 260 adjacent to each other to increase the overlap of the first color beam B11*a* and the second color beam B12 thereby solving the above problem. The number of substrates of the illumination system in accordance with another embodiment of the invention may be plural. As shown in FIG. 4B, the illumination system may include two substrates 270*b* and 270*c*, and the reflective holographic layer 220-1 and the dichroic layer 260 are respectively disposed on the substrates 270*b* and 270*c* and adjacent to each other. Since the reflective holographic layer 220-1 and the dichroic layer 260 are close to each other, the optical path lengths of the first color beam B11*a* and the second color beam B12 are substantially coincident. Specifically, the holographic optical element 220 and the dichroic layer 260 may be disposed on the adjacent two surfaces of the substrates 270*b* and 270*c* respectively, and the mechanism or gluing fixing way may be adopted to tightly couple the reflective holographic layer 220-1 and the dichroic layer 260 to each other, thereby increasing the overlap of the first color beam B11*a* and the second color beam B12. The illumination system 200 may further include two anti-reflective layers 280 disposed on the surfaces of the substrates 270*b* and 270*c* away from the reflective holographic layer 220-1 and the dichroic layer 260 respectively. The anti-reflective layer 280 is used to prevent the first color beam B11*a* and the second color beam B12 from being reflected, thereby avoiding light loss and improving the light utilization efficiency.

Figure 5:
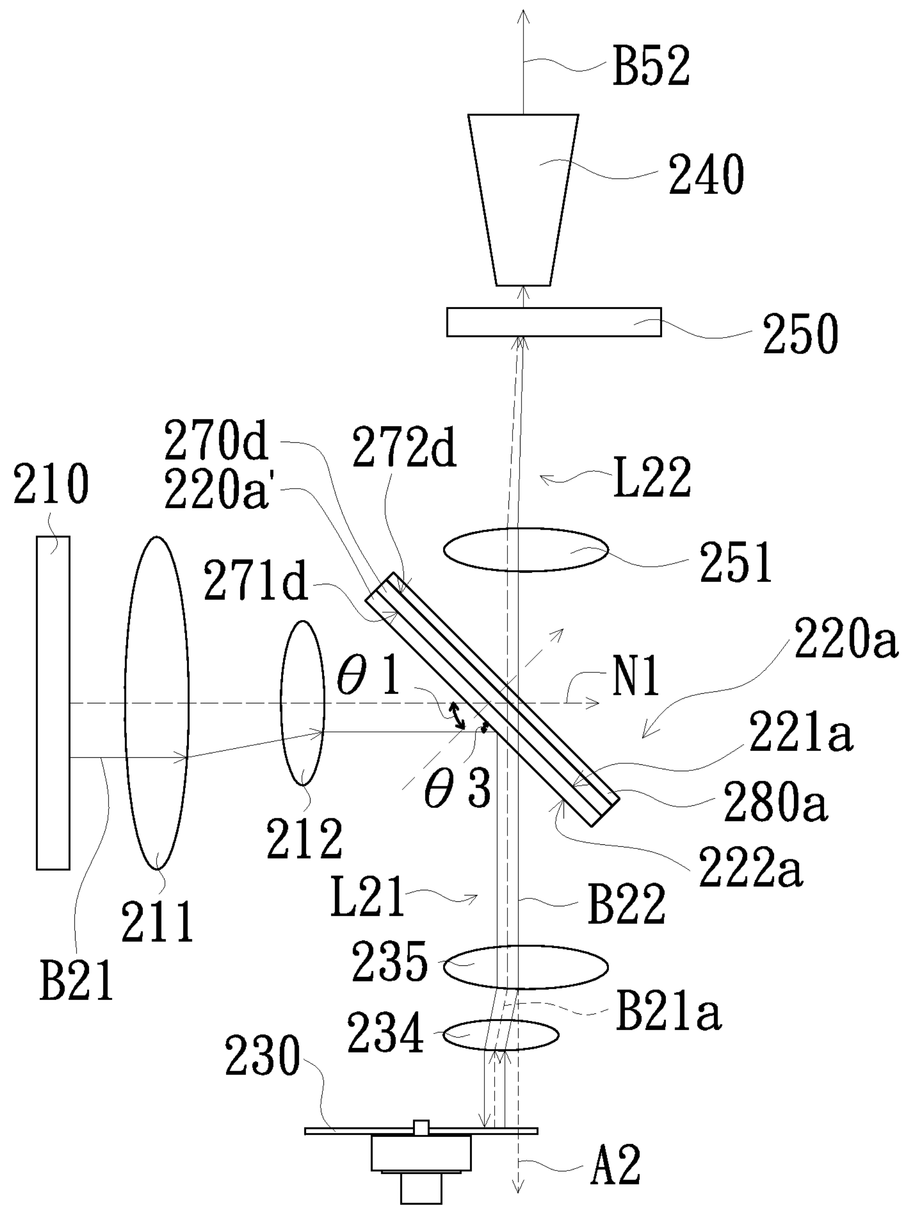
FIG. 5 is a schematic view of an illumination system in accordance with another embodiment of the invention.

FIG. 5 is a schematic view of an illumination system in accordance with another embodiment of the invention. As shown in FIG. 5, the illumination system 200*a* of the embodiment is similar to the illumination system 200 of the above embodiment, and the main difference is that the positions of the holographic optical element 220*a*, the excitation light source 210 and the phosphor wheel 230. Specifically, the holographic optical element 220*a* is located on the first path L21 where the first color beam B21 is transmitted and is located between the excitation light source 210 and the phosphor wheel 230. The phosphor wheel 230 is located in a second extension direction A2 of the second path L22, wherein the second extension direction A2 is, for example, the extension direction of the second path L22 from the bottom surface 222*a* of the holographic optical element 220 to the phosphor wheel 230. The first color beam B21 transmitted from the excitation light source 210 toward the holographic optical element 220*a* is reflected by the holographic optical element 220*s* and is transmitted to the phosphor wheel 230 along the first path L21. In addition, the excitation light source 210 and the phosphor wheel 230 are not opposed to each other for example, and the excitation light source 210 and the phosphor wheel 230 are located on the same side of the bottom surface 222*a* of the holographic optical element 220*a*.

The holographic optical element 220*a* of the embodiment includes a reflective holographic layer 220*a*', a substrate 270*d* and an anti-reflective layer 280*a*. The substrate 270*d* has a first surface 271*d* and a second surface 272*d* opposite to the first surface 271*d*. The first surface 271*d* is located between the second surface 272*d* and the excitation light source 210. The reflective holographic layer 220*a*' is disposed on the first surface 271*d*, and the anti-reflective layer 280*a* is disposed on the second surface 272*d*. The first color beam B21 provided by the excitation light source 210 and having a predetermined incident angle (90-θ3) is reflected by the reflective holographic layer 220*a*' to be irradiated to the light wavelength conversion portion 231 of the phosphor wheel 230 along the first path L21. The first color beam B21 is converted into the second color beam B22 by the light wavelength conversion portion 231 and reflected to the holographic optical element 220*a*, so that the second color beam B22 passes through the holographic optical element 220*a* and is transmitted along the second path L22. The first color beam B21*a* is reflected from the reflective portion 232 of the phosphor wheel 230 to the holographic optical element 220*a*, wherein the first color beam B21*a* is a portion of the first color beam B21. The first color beam B21*a* passes through the holographic optical element 220*a* and is transmitted along the second path L22. Thus, the illumination system 200*a* of the embodiment of the invention can simplify the complex optical layout and reduce the overall volume thereof.

In addition, the reflective holographic layer 220*a*' may be disposed on the second surface 272*d*, the anti-reflective layer 280*a* may be disposed on the first surface 271*d*, and the substrate 270*d* may be designed to be similar to the substrate 270*a* in FIG. 4A and the substrate 270*b* in FIG. 4B, and no redundant detail is to be given herein.

Figure 6:
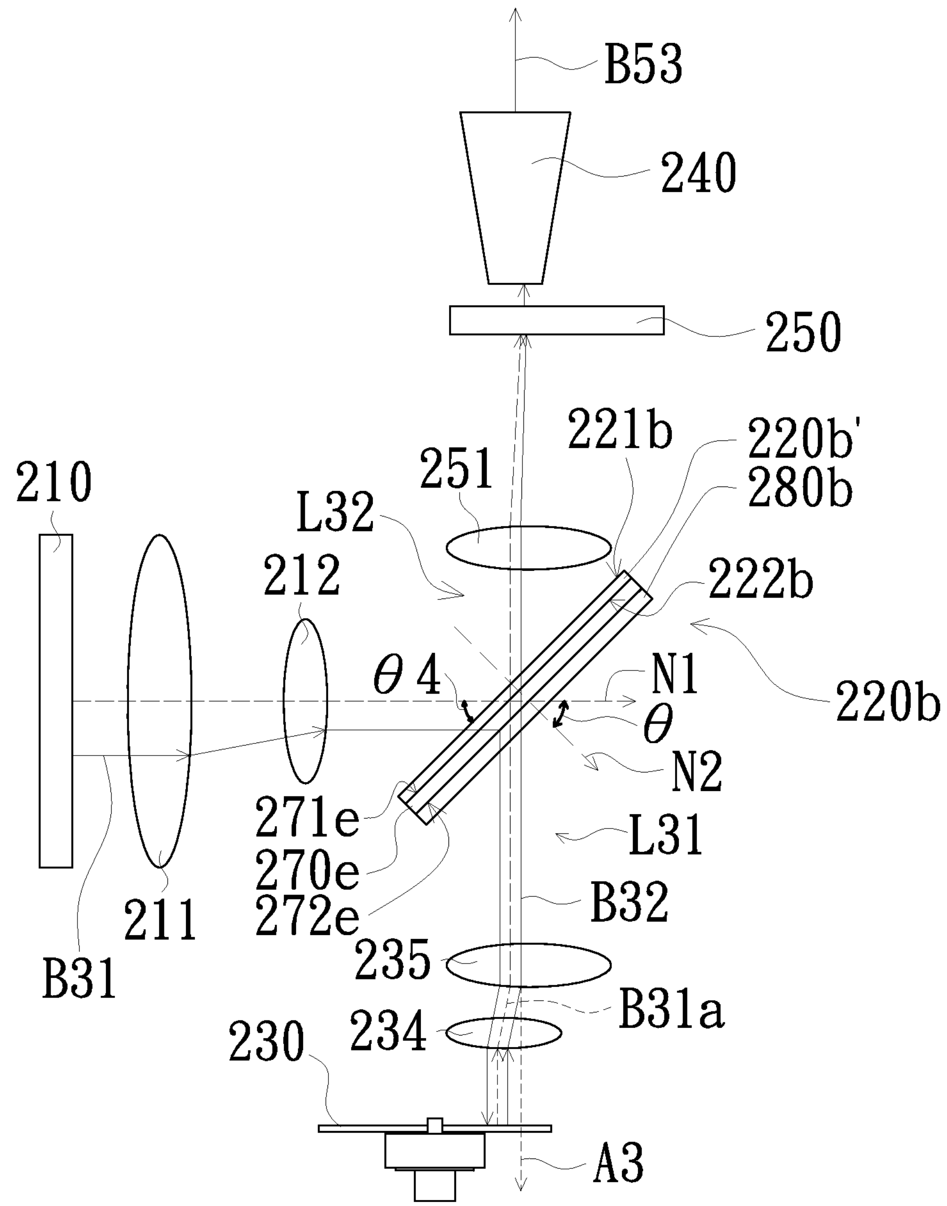
FIG. 6 is a schematic view of an illumination system in accordance with another embodiment of the invention.

FIG. 6 is a schematic view of an illumination system in accordance with another embodiment of the invention. As shown in FIG. 6, the illumination system 200*b* of the embodiment is similar to the illumination system 200*a* of the above embodiment, and the main difference is that the holographic optical element 220*b* is different and the positions of the excitation light sources 210 and the phosphor wheel 230 with respect to the holographic optical element 220*b* are correspondingly adjusted. Specifically, the holographic optical element 220*b* is located between the excitation light source 210 and the phosphor wheel 230. The phosphor wheel 230 is located in a second extension direction A3 of the second path L32, wherein the second extension direction A3 is similar to the second extension direction A2. The first color beam B31 transmitted from the excitation light source 210 toward the holographic optical element 220*b* is refracted by the holographic optical element 220*b* and is transmitted to the phosphor wheel 230 along the first path L31. The second color beam B32 and the first color beam B31*a* reflected from the phosphor wheel 230 pass through the holographic optical element 220*b* and are transmitted along the second path L32, wherein the first color beam B31*a* is a portion of the first color beam B31. In addition, the excitation light source 210 and the phosphor wheel 230 are not opposed to each other, and the excitation light source 210 and the phosphor wheel 230 are located on two sides of the holographic optical element 220*b* respectively.

The holographic optical element 220*b* of the embodiment includes a transmitted holographic layer 220*b*', a substrate 270*e* and an anti-reflective layer 280*b*. The substrate 270*e* has a first surface 271*e* and a second surface 272*e* opposite to the first surface 271*e*. The first surface 271*e* is located between the second surface 272*e* and the excitation light source 210. The transmitted holographic layer 220*b*' and the anti-reflective layer 280*b* are disposed on the first surface 271*e* and the second surface 272*e* respectively. For example, the transmitted holographic layer 220*b*' is disposed on the first surface 271*e*, and the anti-reflective layer 280*b* is disposed on the second surface 272*e*. The first color beam B31 provided by the excitation light source 210 and having a predetermined incident angle (90-θ4) is refracted by the transmitted holographic layer 220*b*' to be irradiated to the light wavelength conversion portion 231 of the phosphor wheel 230 along the first path L31. The first color beam B31 is incident on the transmitted holographic layer 220*b*' and is refracted by the internal structure of the transmitted holographic layer 220*b*' so that the first color beam B31 is directed to the phosphor wheel 230, which is different from the optical principle of the reflective holographic layer. The first color beam B31 is converted into the second color beam B32 and reflected to the holographic optical element 220*b*, so that the second color beam B32 passes through the holographic optical element 220*b* and is transmitted along the second path L32. The first color beam B31*a* is reflected from the reflective portion 232 of the phosphor wheel 230 to the holographic optical element 220*b*. The first color beam B31*a* passes through the holographic optical element 220*b* and is transmitted along the second path L32. Thus, the illumination system 200*b* of the embodiment of the invention can simplify the complex optical layout and reduce the overall volume thereof.

In addition, the transmitted holographic layer 220*b*' may be disposed on the second surface 272*e*, the anti-reflective layer 280*b* may be disposed on the first surface 271*e*, and the substrate 270*e* may be designed to be similar to the substrate 270*a* in FIG. 4A and the substrate 270*b* in FIG. 4B, and no redundant detail is to be given herein. The anti-reflective layer 280*b* has a function similar to that of the anti-reflective layer 280 in FIG. 4B, and no redundant detail is to be given herein.

Although the aforementioned illumination systems 200, 200*a* and 200*b* are exemplified by one excitation light source 210, the illumination system in other embodiments of the invention may include two excitation light sources according to the design requirement, as described below.

Figure 7:
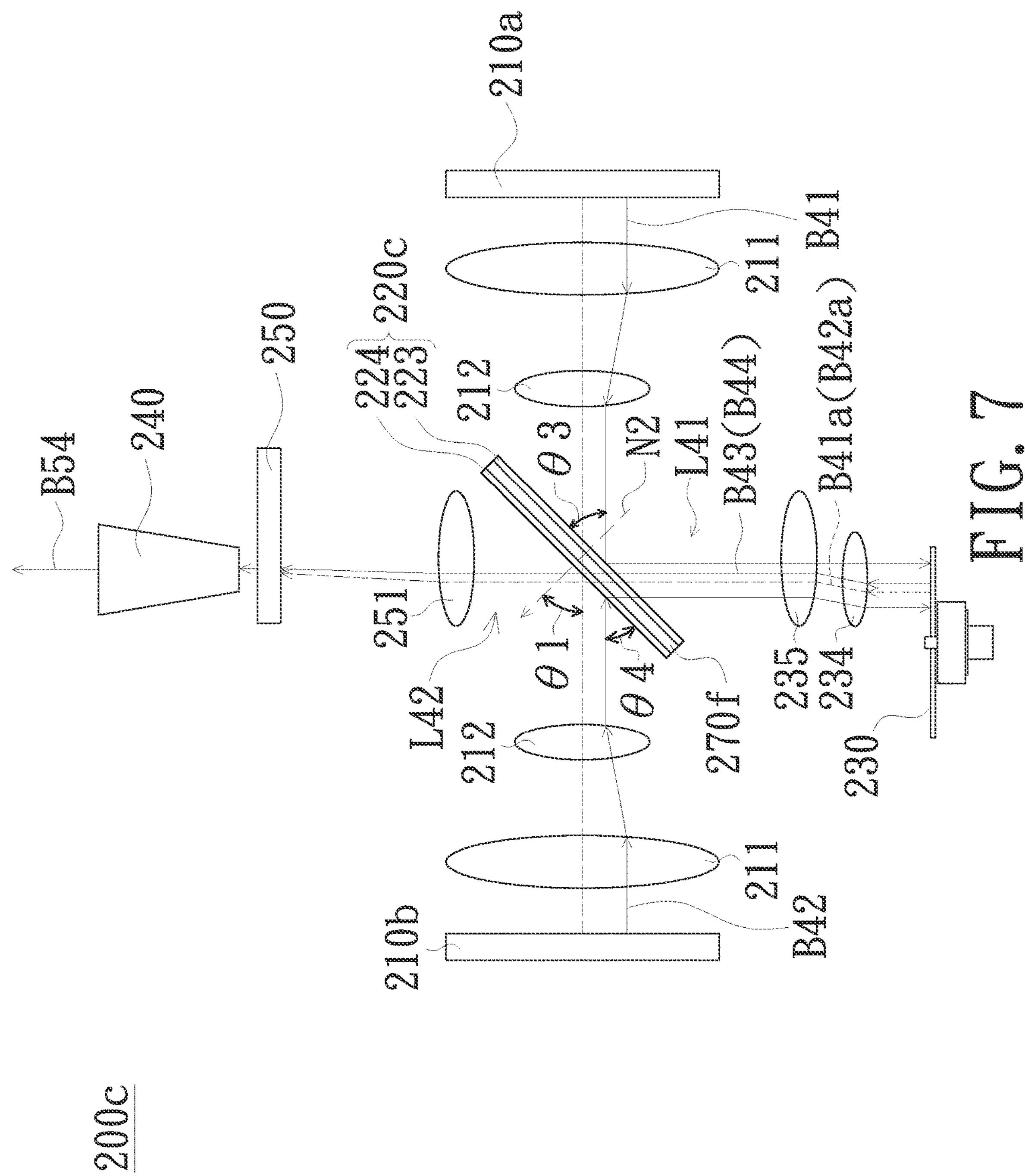
FIG. 7 is a schematic view of an illumination system in accordance with another embodiment of the invention.

FIG. 7 is a schematic view of an illumination system in accordance with another embodiment of the invention. As shown in FIG. 7, the illumination system 200*c* of the embodiment integrates the aforementioned illumination systems 200*a* and 200*b* of the above embodiments. Specifically, the number of the at least one excitation light source of the illumination system 200*c* of the embodiment is two, which are, for example, the first excitation light source 210*a* and the second excitation light source 210*b* opposite to each other. The holographic optical element 220*c* is located between the first excitation light source 210*a* and the second excitation light source 210*b*. The holographic optical element 220*c* includes a reflective holographic layer 223 and a transmitted holographic layer 224, and the reflective holographic layer 223 and the transmitted holographic layer 224 are stacked on each other. In the embodiment, the reflective holographic layer 223 is located between the transmitted holographic layer 224 and the first excitation light source 210*a* for example, but the invention is not limited thereto. In other embodiments, the reflective holographic layer 223 may be located between the transmitted holographic layer 224 and the second excitation light source 210*b*. In addition, the illumination system 200*c* may have the substrate and the anti-reflective layer of the illumination system 200, 200*a* or 200*b*, and no redundant detail is to be given herein.

Further, since the holographic optical element 220*c* of the embodiment has the reflective holographic layer 223, the first color beam B41 provided from the first excitation light source 210*a* and incident at a first predetermined light incident (e.g., predetermined incident angle (90-θ3) is reflected by the reflective holographic layer 223, wherein the first color beams B41 and B41*a* and the second color beams B43 have the light transmission paths similar to those of the first color beams B21 and B21*a* and the second color beam B22 in FIG. 5. In addition, since the holographic optical element 220*c* of the embodiment has the transmitted holographic layer 224, the first color beam B42 provided from the second excitation light source 210*b* and incident at a second predetermined light incident (e.g., predetermined incident angle (90-θ4) is refracted by the transmitted holographic layer 224, wherein the first color beams B42 and B42*a* and the second color beams B44 have the light transmission paths similar to those of the first color beams B31 and B31*a* and the second color beam B32 in FIG. 6. Specifically, the holographic optical element 220*c* further includes a substrate 270*f*. The reflective holographic layer

223 and the transmitted holographic layer 224 are disposed on opposite surfaces of the substrate 270*f* respectively. The first color beams B41 and B42*a* transmitted along the first path L41 are converted into the second color beams B43 and B44 by the phosphor wheel 230 respectively. The first color beams B41*a* and B42*a* are reflected back to the holographic optical element 220*c* by the phosphor wheel 230. The first color beams B41*a* and B42*a* and the second color beams B43 and B44 pass through the reflective holographic layer 223 and the transmitted holographic layer 224 and are transmitted along the second path L42. Thus, the illumination system 200*c* of the embodiment of the invention can simplify the complex optical layout and reduce the overall volume thereof.

Figure 8:
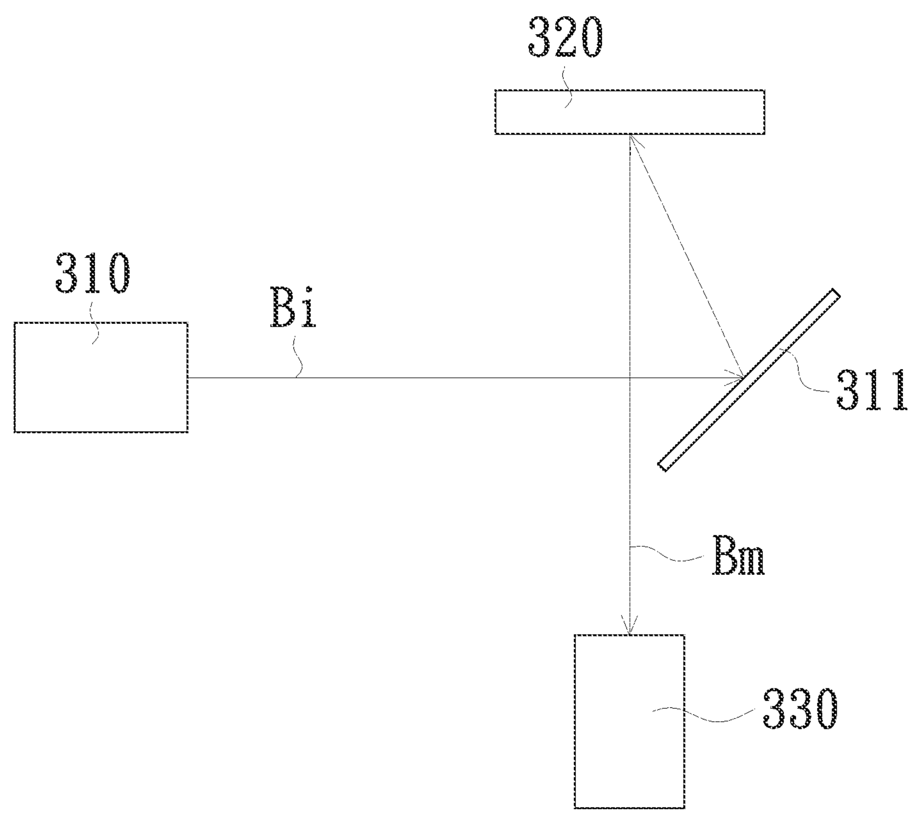
FIG. 8 is a schematic view of a projection apparatus in accordance with an embodiment of the invention.

FIG. 8 is a schematic view of a projection apparatus in accordance with an embodiment of the invention. As shown in FIG. 8, the projection apparatus 300 of the embodiment includes a light valve 320, a projection lens 330 and an illumination system 310. The light valve 320 is disposed on the transmission path of an illumination beam Bi provided by the illumination system 310 to convert the illumination beam Bi into an image beam Bm. The projection lens 330 is disposed on the transmission path of the image beam Bm to project the image beam Bm onto a screen (not shown), thereby forming an image on the screen. The illumination system 310 may be an illumination system of any of the embodiments described above, such as the illumination system 200, 200*a*, 200*b* or 200*c*. In addition, although FIG. 8 is exemplified by one light valve 320, the number of the light valves 320 may be plural in other embodiments. In addition, the light valve 320 of the embodiment is, for example, a reflective light valve such as a digital micro-mirror device (DMD) or a liquid crystal on silicon (LCoS) panel. A reflective element 311 may be disposed on the transmission path of the illumination beam Bi to reflect the illumination beam Bi to the light valve 320, but the illumination beam Bi may be irradiated to the light valve 320 by other optical elements. In other embodiments, the light valve 320 may be a transmissive light valve (e.g., a transmissive liquid crystal panel), and accordingly the types and arrangement positions of the related optical elements may be appropriately adjusted.

In summary, the illumination system of the embodiment of the invention is disposed with a holographic optical element on the transmission path of the first color beam, and the first color beam provided from the excitation light source is transmitted to the light wavelength conversion portion and the reflective portion of the phosphor wheel by the holographic optical element. Thus, the second color beam reflected by the light wavelength conversion portion and the first color beam reflected by reflective portion are reflected back to the holographic optical element, pass through the holographic optical element and are transmitted along the same path, thereby forming an illumination beam. Therefore, compared with the prior art, the illumination system of the embodiment of the invention can simplify the complex optical layout and reduce the overall volume thereof due to employing less number of optical elements.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. An illumination system, comprising:

at least one excitation light source, for providing a first color beam;

a holographic optical element, located on a transmission path of the first color beam and for transmitting the first color beam along a first path; and a phosphor wheel, having a light wavelength conversion portion and a reflective portion, the light wavelength conversion portion is for converting the first color beam into a second color beam and reflecting the second color beam back to the holographic optical element, the reflective portion is for reflecting the first color beam back to the holographic optical element, the holographic optical element is for transmitting the second color beam and the first color beam reflected from the phosphor wheel along a second path, and the first path is different from the second path, wherein the holographic optical element comprises a dichroic layer and a reflective holographic layer, the reflective holographic layer is for allowing the first color beam transmitted from the at least one excitation light source toward the holographic optical element to pass therethrough and transmitting to the phosphor wheel along the first path, and the reflective holographic layer is for reflecting the first color beam transmitted from the phosphor wheel toward the reflective holographic layer and incident at a predetermined incident angle to be transmitted along the second path, and the dichroic layer is for allowing the first color beam to pass therethrough and reflecting the second color beam, so that the second color beam is transmitted along the second path.

2. The illumination system according to claim 1, wherein the holographic optical element is located between the at least one excitation light source and the phosphor wheel, and the at least one excitation light source is located in a first extension direction of the first path.

3. The illumination system according to claim 1, wherein the reflective holographic layer and the dichroic layer are stacked on each other.

4. The illumination system according to claim 1, wherein the holographic optical element further comprises a substrate, the substrate has a first surface and a second surface opposite to the first surface, the reflective holographic layer is disposed on the first surface, and the dichroic layer is disposed on the second surface.

5. The illumination system according to claim 4, wherein the first surface is located between the second surface and the at least one excitation light source.

6. The illumination system according to claim 1, wherein the holographic optical element further comprises two substrates, and the reflective holographic layer and the dichroic layer are disposed on the substrates and adjacent to each other respectively.

7. The illumination system according to claim 6, wherein the holographic optical element further comprises two anti-reflective layers disposed on surfaces of the substrates away from the reflective holographic layer and the dichroic layer respectively.

8. The illumination system according to claim 1, wherein the first color beam is a blue beam, and the second color beam is a yellow beam or a red beam.

9. The illumination system according to claim 1, wherein the at least one excitation light source has a light exit surface, the light exit surface has an optical axis, the holographic optical element has a top surface corresponding to the light exit surface, there is an included angle between the optical axis and a normal line of the top surface, and an angle of the included angle is between 20 degrees and 70 degrees.

10. The illumination system according to claim 1, further comprising a light integration rod and a filter wheel, wherein the light integration rod and the filter wheel are disposed on the second path, and the filter wheel is located between the light integration rod and the holographic optical element.

11. A projection apparatus, comprising:

an illumination system, for providing an illumination beam, wherein the illumination system comprises:

at least one excitation light source, for providing a first color beam;

a holographic optical element, located on a transmission path of the first color beam and for transmitting the first color beam to the phosphor wheel along a first path; and a phosphor wheel, having a light wavelength conversion portion and a reflective portion, the light wavelength conversion portion is for converting the first color beam into a second color beam and reflecting the second color beam back to the holographic optical element, the reflective portion is for reflecting the first color beam back to the holographic optical element, the holographic optical element is for transmitting the second color beam and the first color beam reflected from the phosphor wheel along a second path, and the first path is different from the second path, wherein the holographic optical element comprises a dichroic layer and a reflective holographic layer, the reflective holographic layer is for allowing the first color beam transmitted from the at least one excitation light source toward the holographic optical element to pass therethrough and transmitting to the phosphor wheel along the first path, and the reflective holographic layer is for reflecting the first color beam transmitted from the phosphor wheel toward the reflective holographic layer and incident at a predetermined incident angle to be transmitted along the second path, and the dichroic layer is for allowing the first color beam to pass therethrough and reflecting the second color beam, so that the second color beam is transmitted along the second path;

a light valve, disposed on a transmission path of the illumination beam provided by the illumination system and for converting the illumination beam into an image beam; and a projection lens, disposed on a transmission path of the image beam.

* * * * *